United States Patent
Ise

(10) Patent No.: US 8,883,659 B2
(45) Date of Patent: Nov. 11, 2014

(54) AIRBAG AND AN AIRBAG FABRIC COMPRISING A POLYAMIDE YARN

(71) Applicant: Asahi Kasei Fibers Corporation, Osaka (JP)

(72) Inventor: Fumiaki Ise, Tokyo (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 0 days.

(21) Appl. No.: 14/141,352

(22) Filed: Dec. 26, 2013

(65) Prior Publication Data

US 2014/0106098 A1 Apr. 17, 2014

Related U.S. Application Data

(62) Division of application No. 13/390,482, filed as application No. PCT/JP2010/059383 on Jun. 2, 2010, now Pat. No. 8,642,489.

(30) Foreign Application Priority Data

Nov. 9, 2009 (JP) ................................ 2009-256424

(51) Int. Cl.
  *B60R 21/16* (2006.01)
  *D03D 13/00* (2006.01)
  *D03D 1/02* (2006.01)
  *B60R 21/235* (2006.01)

(52) U.S. Cl.
  CPC ............ *B60R 21/235* (2013.01); *D03D 13/008* (2013.01); *D03D 1/02* (2013.01); *B60R 2021/23509* (2013.01)
  USPC ..................... 442/168; 280/728.1; 280/743.1; 428/34.5; 442/76

(58) Field of Classification Search
  CPC ....... D03D 1/02; D03D 13/008; D03D 15/00; B60R 21/235; B60R 2021/23509; B60R 21/16; B32B 1/02; B32B 5/024
  USPC ......... 280/728.1, 743.1; 428/34.1, 34.5, 35.5; 442/168, 169, 189, 203, 208, 228
  See application file for complete search history.

(56) References Cited

U.S. PATENT DOCUMENTS

| | | | |
|---|---|---|---|
| 5,474,836 A | 12/1995 | Nishimura et al. | |
| 6,601,614 B1 | 8/2003 | Ishii | |
| 6,832,633 B2 | 12/2004 | Kitamura et al. | |
| 2002/0155774 A1 | 10/2002 | Kitamura et al. | |

FOREIGN PATENT DOCUMENTS

| | | |
|---|---|---|
| EP | 1 026 049 | 8/2000 |
| JP | 5-7965 | 1/1993 |
| JP | 05-339840 | 12/1993 |
| JP | 06-306731 | 11/1994 |
| JP | 08-041751 | 2/1996 |
| JP | 10-060750 | 3/1998 |
| JP | 2000-192331 | 7/2000 |
| JP | 2002-249952 | 9/2002 |
| JP | 2002-317343 | 10/2002 |
| JP | 2006-183205 | 7/2006 |
| JP | 2009-242958 | 10/2009 |
| WO | WO 93/15138 | 8/1993 |
| WO | WO 01/09416 A1 | 2/2001 |
| WO | WO 2009/084334 A1 | 7/2009 |

OTHER PUBLICATIONS

English-language International Search Report from the Japanese Patent Office mailed Aug. 31, 2010, for International Application No. PCT/JP2010/059383.
European Search Report for EP Application No. 10828123.9, dated Feb. 13, 2014.

*Primary Examiner* — Arti Singh-Pandey
(74) *Attorney, Agent, or Firm* — Finnegan, Henderson, Farabow, Garrett & Dunner, L.L.P.

(57) ABSTRACT

An object of the present invention is to provide an airbag module ensuring that when an airbag fabricated using a fabric composed of a polyamide yarn excellent in heat resistance is deployed by an inflator gas, the deployment occurs without loss of the gas and an excessive amount of generated gas is not necessary, as a result, the inflator is reduced in weight, and the airbag module of the present invention comprises an airbag fabric composed of a polyamide yarn, wherein the air permeability of the fabric under a pressure of 200 kPa is from 10 to 200 cc/cm²/sec and in the thermal stress of the constituent yarn as measured under the conditions of an initial load of 0.02 cN/dtex, a yarn length of 25 cm and a temperature rise rate of 80° C./min, the summed thermal stress of the total of the warp yarn and the weft yarn at 230° C. is from 0.33 to 1.20 cN/dtex.

12 Claims, No Drawings

AIRBAG AND AN AIRBAG FABRIC COMPRISING A POLYAMIDE YARN

This is a division of application Ser. No. 13/390,482, §371 (c) date of Feb. 14, 2012, pending, which claims the benefit of PCT/JP2010/059383, filed Jun. 2, 2010, and claims benefit to JP 2009-256424, filed Nov. 9, 2009, all of which are incorporated herein by reference.

TECHNICAL FIELD

The present invention relates to an airbag capable of absorbing impact on the human body in a vehicle accident and protecting the human body. More specifically, the present invention relates to an airbag fabric, an airbag and an airbag module, which are lightweight and has excellent storability.

BACKGROUND ART

In order to relieve impact on the human body in a car accident, mounting of an airbag in a vehicle is proceeding. As an airbag capable of inflating by gas or the like and absorbing impact on the human body in a collision, for the protection of an occupant, a curtain airbag, a side airbag, a knee airbag, a rear airbag and the like are being put into practice, in addition to a driver's sheet airbag and a passenger sheet airbag. Furthermore, for the protection of a pedestrian, mounting of various airbags such as an airbag on the outside of the vehicle is in discussion. On the other hand, with the growing interest in environmental problems, from the standpoint of improving fuel efficiency of a vehicle, weight saving is also required of an airbag module. Also, in order to enhance fuel efficiency or energy efficiency by reducing vehicle size, the region in which the airbag module is stored is becoming narrower, and more reduced size is necessary.

The airbag module mainly comprises an airbag obtained by forming a fabric composed of a synthetic fiber into a bag shape, an inflator for generating gas capable of deploying the airbag, and a device for detecting a collision and controlling the deployment. Of these members, the inflator is composed of a strong container for housing a propellant in the container and generating a high-pressure high-speed gas therefrom, or composed of a strong high-pressure gas container for housing a high-pressure gas in the container and generating a high-pressure high-speed gas by opening the container with an explosive. Accordingly, its weight or volume accounts for a large part of the airbag module.

As for the airbag, in order to reduce the weight thereof, reducing the fineness of the fiber constituting the airbag fabric or fabrication of a non-coated airbag by using an airbag fabric substantially uncoated with a resin or an elastomer is being carried out.

Compared with a coated airbag, the deployment gas in the non-coated airbag is not sufficiently utilized. In an airbag for front collision accident, such as a driver's seat airbag and passenger seat airbag having a long history of airbag mounting, after the airbag is deployed by gas, the gas is released from a vent hole provided in the airbag or a filter fabric part so as to receive the human body and thereby the impact energy is absorbed. Accordingly, the amount of leakage of the deployment gas in the non-coated airbag is not strictly taken as a problem. However, in recent years, a change in the deployment size of the airbag by controlling the opening of the vent hole or employing an airbag undergoing stepwise the deployment is proceeding. Further, mounting a side curtain airbag aimed at quick deployment without the vent hole is being employed. In turn, also as the non-coated airbag, an airbag ensuring more reduction in the loss of the deployment gas during deployment than ever is demanded. Furthermore, when there is no loss of the deployment gas, the volume of the inflator need not be excessively increased and the airbag module can be expected to be reduced in the size.

With respect to the air permeability of the non-coated airbag under high pressure, Patent Document 1 discloses a technique demonstrating that higher air permeability is more effective in reducing the impart, but the desire is to increase the gas utilization efficiency by suppressing the air permeability under high pressure as much as possible. Also, Patent Document 2 discloses an airbag technique of fabricating a non-coated airbag by using a fabric composed of a polyester filament yarn to cause no change in the permeability or bursting strength under a high-temperature high-humidity environment, but in a polyester fabric, a melted hole may be produced due to burning residue from the propellant in the inflator and a rupture may be caused, and it is demanded to fabricate an airbag fabric ensuring lower air permeability under high pressure by using a polyamide fabric excellent in heat resistance.

With respect to the pressure resistance of the airbag after a heat treatment, Patent Document 3 describes excellent tear tenacity retention of a polycapramide fiber after a heat treatment, but for preventing the airbag from melting and rupturing due to a high-temperature gas or reaction residue in case of using an explosive for the inflation gas, the fiber above is inferior to the polyamide 6•6 fiber in view of melting temperature. In the fabric composed of a polycapramide fiber, bag deployment by an explosive is improper. Patent Document 4 describes a technique of enhancing the tear tenacity by imparting a polysiloxane-based softener by immersion, but it is unprofitable to specially use a treating agent or increase the processing step. Also, the weaving yarn in the sewn part is slid off to cause fiber dropout, and this impairs the strength of the sewn part. Patent Document 5 demonstrates that in the finish oil-imparted fabric without scouring, the tear tenacity may be maintained, but this document is silent about the characteristics such that the deployment speed is maintained after a heat treatment. Patent Document 6 demonstrates that by incorporating a thermal stabilizer into a polycapramide fiber to make an original yarn allowing generation of a thermal shrinkage stress at a higher temperature, the increase in air permeability of the airbag base cloth after a heat treatment can be suppressed. However, even if low air permeability is maintained after a heat treatment, characteristics necessary to maintain the deployment speed are not described.

Conventionally, for the airbag mounted in the interior of an automobile, i.e., in a cabin, it is important that the airbag stored for a long term under the conditions of summer and daytime high temperatures or winter and nighttime low temperatures maintains the deployment performance such as pressure resistance at the actuation of inflation and deployment after the elapse of days. However, the place in which an airbag loaded to inflate toward the outside of the vehicle for the protection of a pedestrian is mainly mounted is outside the cabin and particularly, when the place is near the engine room inside the bonnet, the airbag is exposed to a harsher environmental condition. That is, durability of the airbag under a harsh environment is more stringently required. The task is to maintain the deployment performance after the elapse of days under harsher environmental conditions.

The airbag for the protection of a pedestrian takes such a large area and a large dimension as covering the front part of the bonnet or the lower part of the front glass. Also, compared with the case of relieving the short distance collision in an automobile, large inflation is used. Accordingly, such an airbag is a large-volume airbag, but the deployment speed of the airbag stored for a long term is disadvantageously slowed after many days. Even when a proper deployment timing of the airbag is adjusted by a detector or a deployment/ignition control device, if the timing is lagged because of, for example, a delay caused until the gas functions by permeating from end to end during deployment of the bag, the impact absorbing performance is deteriorated. Accordingly, the task is also to maintain the deployment speed of a large-volume airbag under harsh environmental condition.

PRIOR ART

Patent Document

Patent Document 1: Japanese Unexamined Patent Publication No. 2002-317343
Patent Document 2: Japanese Unexamined Patent Publication No. 6-306731
Patent Document 3: Japanese Unexamined Patent Publication No. 10-60750
Patent Document 4: Japanese Unexamined Patent Publication No. 8-41751
Patent Document 5: Japanese Unexamined Patent Publication No. 5-339840
Patent Document 6: Japanese Unexamined Patent Publication No. 2006-183205

SUMMARY OF THE INVENTION

Problems to be Solved by the Invention

An object of the present invention is to provide an airbag module ensuring that when an airbag fabricated using a fabric composed of a polyamide fiber excellent in heat resistance is deployed by an inflator gas, the deployment is performed without loss of the gas and an excessive amount of generated gas is not required, as a result, the inflator is reduced in the weight. In particular, an object of the present invention is to provide an airbag module where a non-coated airbag is excellent in the burst resistance and capable of performing high-speed deployment without loss of gas. Another object of the present invention is to provide an airbag module having high reliability even under a high-temperature high-humidity environment.

Means to Solve the Problems

In order to attain the above-described objects, the present invention has the following configurations.

(1) An airbag fabric comprising a polyamide yarn, wherein the air permeability of the fabric under a pressure of 200 kPa is from 10 to 200 cc/cm$^2$/sec and in the thermal stress of the constituent yarn as measured under the conditions of an initial load of 0.02 cN/dtex, a yarn length of 25 cm and a temperature rise rate of 80° C./min, the summed thermal stress of the total of the warp yarn and the weft yarn at 230° C. is from 0.33 to 1.20 cN/dtex.

(2) The airbag fabric as described in item 1 above, wherein from 0.1 to 100 ppm in total of at least one element selected from zinc, aluminum and magnesium, from 10 to 500 ppm of a copper element, from 100 to 3,500 ppm in total of iodine and/or bromine, and from 0.01 to 20 ppm of an iron element are contained in the fabric.

(3) The airbag fabric as described in item 2 above, which comprises a polyamide fiber melt-spun with the addition of a fatty acid metal salt.

(4) The airbag fabric as described in any one of items 1 to 3 above, wherein the cyclic unimer content in the fabric is from 0.1 to 3.0% based on all amide bond units.

(5) The airbag fabric as described in item 4 above, wherein the polyamide fiber is obtained by melt-spinning with the addition of an oligomer containing a cyclic unimer.

(6) The airbag fabric as described in any one of items 1 to 5 above, wherein the content of the finish oil component in the fabric is from 0.01 to 2.0 wt %.

(7) The airbag fabric as described in any one of items 1 to 6 above, wherein the total widening Ws as the sum of the widening ratio R(f) of the weft yarn and the widening ratio R(w) of the warp yarn on the fabric surface is from 0 to 40%.

(8) The airbag fabric as described in any one of items 1 to 7 above, wherein the widening ratio R(f) of the weft yarn on the fabric surface is from 90 to 120% and the widening ratio R(w) of the warp yarn on the fabric surface is from 105 to 135%.

(9) The airbag fabric as described in any one of items 1 to 8 above, wherein in the stress-strain curve of the fabric, the total value of the elongation under a load corresponding to 4.0 cN/dtex in terms of a stress per one yarn constituting the fabric in the warp direction and that in the weft direction is from 40.0 to 58.0%.

(10) The airbag fabric as described in any one of items 1 to 9 above, wherein in DSC measurement of measuring the fabric at a temperature rise rate of 20° C./min, the melting initiation temperature is from 245 to 280° C. and the heat of melting is from 60 to 100 J/g.

(11) The airbag fabric as described in any one of items 1 to 10 above, wherein the thermal stress determined by measuring the constituent yarn of the fabric under the conditions of an initial load of 0.02 cN/dtex, a yarn length of 25 cm and a temperature rise rate of 80° C./min is from 0.005 to 0.10 cN/dtex at 120° C. in both the warp yarn and the weft yarn.

(12) The airbag fabric as described in any one of items 1 to 11 above, wherein the constituent yarn is a polyamide 6•6 yarn having a relative viscosity of 2.7 to 4.7, a single filament fineness of 0.8 to 8.0 dtex, a total yarn fineness of 100 to 800 dtex, a tensile tenacity of 5.0 to 11.0 cN/dtex, an elongation at break of 15 to 35% and a shrinkage in boiling water of −4.5 to 5.0%.

(13) The airbag fabric as described in any one of items 1 to 12 above, which is not coated with a resin or an elastomer.

(14) An airbag using the airbag fabric described in any one of items 1 to 13 above.

(15) An airbag module using the airbag described in item 14 above.

Effects of the Invention

The airbag fabric of the present invention is composed of a polyamide fiber excellent in heat resistance and despite excellent storability, capable of restraining the passage of deployment gas during deployment by a high-temperature gas and furthermore, reducing the gas leakage from the sewn part after thermal aging, and can fabricate an airbag overall excellent in utilization of the deployment gas. Accordingly, the entire amount of the gas produced in the inflator can be made use of and utilized for deployment, so that a lightweight small airbag module can be provided without excessively increasing the volume of the inflator used for the airbag module. Also, due to the strengthened sewn part, the burst resistance is excellent and high-speed deployment becomes possible. Furthermore, the physical properties are restrained from changing with thermal aging and an airbag module having high reliability even under a high-temperature high-humidity environment can be provided.

MODE FOR CARRYING OUT THE INVENTION

The present invention is specifically described below.

The polyamide fiber constituting the fabric of the present invention includes a fiber composed of polyamide 6, polyamide 6•6, polyamide 11, polyamide 12, polyamide 6•10, polyamide 6•12, polyamide 4•6, a copolymer thereof, and a mixture thereof. In particular, a polyamide 6•6 fiber is preferred, and the polyamide 6•6 fiber is preferably composed of mainly a polyhexamethylene adipamide fiber. The polyhexamethylene adipamide fiber indicates a polyamide fiber consisting of 100% of hexamethylenediamine and adipic acid and having a melting point of 250° C. or more. The polyamide 6•6 fiber for use in the present invention may be a fiber composed of a polymer obtained by copolymerizing or blending polyamide 6, polyamide 6•I, polyamide 6•10, polyamide 6•T or the like with polyhexamethylene adipamide within the range keeping the melting point from becoming less than 250° C.

The relative viscosity $\eta r$ of the polyamide 6•6 fiber is preferably from 2.7 to 4.7. When the relative viscosity $\eta r$ is 2.7 or more, the fabric constituent yarn can be a high-strength yarn contributing to the strength-elongation characteristics good enough as an airbag fabric. Also, when the relative viscosity is 4.7 or less, mixing of a weak yarn and a thin yarn is eliminated, and a high-quality fabric as an airbag fabric is easily obtained without suffering an adverse effect of producing a conspicuous fabric defect due to broken filaments in yarn. The relative viscosity $\eta r$ as used herein is determined by dissolving 2.5 g of a sample in 25 cc of concentrated sulfuric acid (98%) and measuring the solution by an Ostwald viscometer at a given temperature in a constant-temperature bath (25° C.).

The polyamide 6•6 polymer is synthesized through condensation polymerization by solution polymerization and includes a polymer by continuous polymerization and a polymer by batch polymerization. In the present invention, for adjusting the relative viscosity $\eta r$ to from 2.7 to 4.7, the polymerization degree is increased by further subjecting the polymer by the process of both polymerizations to removal of condensation water in a solid-phase polymerization step. Further, the polymerization degree is increased by providing a vacuum step as the final step of the continuous polymerization process and removing the condensation water, whereby a high-viscosity polymer can be obtained.

The polyamide 6•6 polymer is spun into a polyamide 6•6 fiber by a melt extruder. The polymer may be also spun directly after the continuous polymerization process. In the course of melt extrusion, the moisture percentage in the polymer is controlled, whereby the relative viscosity $\eta r$ of the polyamide 6•6 fiber constituting the fabric of the present invention can be controlled. In particular, high $\eta r$ is obtained by a low moisture percentage. The moisture percentage in the polymer can be controlled by applying drying or moisture absorption to the polymer before melting or by vacuum suctioning the polymer during melting.

The shrinkage in boiling water of the polyamide 6•6 fiber constituting the fabric is 5.0% or less, and as the shrinkage is lower, the fabric has higher shape stability and in the case of a large airbag, the shape can be prevented from changing with aging in a high-temperature environment. Also, the tear resistance in a harsh environment, i.e., after thermal aging, is good and this contributes to enhancing the gas pressure resistance of the airbag. Furthermore, change in the air permeability is suppressed and due to the crimp morphology of the fiber, the fabric exhibits good flexibility, so that a short deployment time of the airbag can be maintained. The shrinkage in boiling water of the polyamide 6•6 yarn constituting the fabric is derived from the shrinkage in boiling water of the original polyamide 6•6 fiber as the weaving yarn, and is determined in the course of drying and heatsetting the fabric. The shrinkage in boiling water of the original polyamide 6•6 fiber as the weaving yarn is preferably 10.0% or less, more preferably 8.0% or less. Furthermore, by controlling the temperature, residence time and tension so that shrinkage is developed in the course of drying and heatsetting the fabric, the shrinkage in boiling water of the polyamide 6•6 yarn constituting the fabric can be kept to a low shrinkage of 5.0% or less. As the shrinkage in boiling water of the polyamide 6•6 yarn constituting the fabric, both full shrinkage and apparent minus shrinkage due to water absorption by a boiling water treatment, that is, shrinkage in which elongation is observed, are also preferred. Accordingly, the shrinkage in boiling water of the polyamide 6•6 yarn constituting the fabric is preferably −4.5% or more. The shrinkage in boiling water is preferably from −4.5 to 5.0%, more preferably −4.0 to 3.0%, still more preferably from −3.0 to 2.5%.

The single filament fineness and total yarn fineness of the polyamide 6•6 yarn greatly affect mechanical characteristics and storability as an airbag and therefore, the single filament fineness is preferably from 0.8 to 8.0 dtex, more preferably from 1 to 7 dtex. When the single filament fineness is 0.8 dtex or more, a fiber defect or the like derived from single filament breaking, for example, in the weaving step can be avoided. The single filament fineness is 8.0 dtex or less and as this fineness is smaller, a fabric ensuring lower bulkiness of the folded fabric and better airbag storability is provided.

The total yarn fineness is preferably from 100 to 800 dtex, more preferably from 200 to 500 dtex. When the total yarn fineness is 100 dtex or more and as thicker, the tenacity of the airbag fabric becomes higher and the gas pressure resistance of the airbag is increased. When the total yarn fineness is 800 dtex or less and as thinner, a lightweight fabric results. It is better to appropriately match the single filament fineness or the total yarn fineness in the above ranges.

The tensile tenacity of the polyamide 6•6 yarn constituting the fabric is preferably from 5.0 to 11.0 cN/dtex, more preferably from 6.0 to 10.5 cN/dtex, and most preferably from 7.0 to 10.0 cN/dtex. The elongation at break is preferably from 15 to 35%.

When the tensile strength is as high as 5.0 cN/dtex or more, the tenacity as an airbag fabric is excellent. The polyamide 6•6 yarn having a tensile strength of 11.0 cN/dtex or less is balanced between the tensile strength and the elongation at break. Also, when the elongation at break is 15% or more, the fabric is kept from becoming coarse and hard, whereas the polyamide 6•6 yarn having an elongation at break of 35% or less is balanced between the elongation at break and the tensile strength. The tensile strength of the polyamide 6•6 yarn constituting the fabric is mainly derived from the tensile strength of the original polyamide 6•6 fiber used as the weaving yarn. The tensile strength of the polyamide 6•6 fiber as the weaving yarn is preferably about 5.5 cN/dtex or more, and the fabric can be composed of a high-strength yarn free from abnormal abrasion even in a high-density weaving process. The elongation at break of the polyamide 6•6 yarn constituting the fabric is mainly derived from the elongation at break of the polyamide 6•6 fiber used as the weaving yarn. The elongation at break of the polyamide 6•6 fiber as the weaving yarn is preferably about 20.0% or more and in this case, the fabric can be composed of a high-elongation yarn free from abnormal tension load even in a high-density weaving process.

In DSC measurement of measuring the fabric at a temperature rise rate of 20° C./min, the fabric of the present invention preferably has a melting initiation temperature of 245 to 280° C. and a heat of melting of 60 to 100 J/g. For comparing the meltability in the state of the airbag being gas-inflated, the fabric sample is measured by placing a fabric of almost the same size as the pan for DSC measurement on the bottom of the pan, and fixing the outer peripheral end of the sample by swaging together with the pan cover, thereby confining the sample. The melting initiation temperature is a temperature at which in advance of crystal melting, the polymer orientation in the lower temperature fiber starts undergoing entropic relaxation. When the melting initiation temperature is 245° C. or more and the heat of melting is 60 J/g or more, flying coming of a residue, i.e., a hot particle, produced by the deployment gas generation in the inflator is less liable to produce a melted hole in the fabric and lead to rupture or bursting. The heat of melting is derived from the crystal melting of the polyamide polymer. When the enthalpy of crystal melting is high and crystallization degree is high, the heat of melting is large, but the enthalpy of crystal melting is determined by the difference in the enthalpy between the crystal state and the melted state and therefore, the heat of melting is thermodynamically determined by selecting the polyamide polymer chain. The crystallization degree varies depending on the heat treatment conditions when spinning and stretching the polymer, and a high-temperature hot stretching is effective. However, the polyamide fiber is a paracrystal where a fine crystal is mixed with an amorphous part, and is limited in the crystallization degree. As a result, in practice, the heat of melting is 100 J/g or less. The heat of melting is more preferably from 70 to 90 J/g.

The melting initiation temperature is a temperature at which high orientation of the polymer chain starts being relaxed, and is affected by the polymer structure fixing resulting from hot drawing in the spin-draw step, the heat setting of the polymer structure in the weaving/processing step, or the cloth structure. The melting initiation temperature precedes crystal melting and is at the highest a crystal melting temperature of the polyamide fiber and 280° C. or less. The melting initiation temperature is more preferably from 248 to 270° C. For raising the melting initiation temperature, the orientation of the polyamide yarn constituting the fabric is preferably heat-set, and the shrinkage in boiling water of the yarn constituting the fabric is preferably 5.0% or less and not lower than −4.5%, more preferably not lower than −4.0%, still more preferably 4.0% or less and not lower than −3.0%. The melting initiation temperature is higher as the yarn woven at a high density are more tightly bound to each other and therefore, the cover factor of the fabric is preferably 2,000 or more, more preferably 2,200 or more, still more preferably 2,300 or more. The cover factor as used herein is a value obtained by adding the product of the square root of fineness (dtex) and the weave density (yarns/2.54 cm) of the warp yarn to that of the weft yarn.

In the fabric of the present invention, the air permeability under a pressure of 200 kPa at ordinary temperature is preferably from 10 to 200 cc/cm²/sec. When the air permeability at ordinary temperature is 200 cc/cm²/sec or less and as lower, the gas leakage during deployment by a high-temperature gas is reduced. In order to reduce the air permeability under a pressure of 200 kPa at ordinary temperature, the cover factor of the fabric is preferably 2,000 or more, more preferably 2,200 or more, still more preferably 2,300 or more. Also, the single filament fineness of the fiber constituting the fabric is preferably from 0.8 to 8.0 dtex, more preferably from 1.0 to 7.0 dtex, and as the fineness is thinner, the air permeability can be more reduced. The single filament fineness is still more preferably from 1.5 to 5.0 dtex. Keeping low the air permeability under high pressure at ordinary temperature is a necessary requirement for the low air permeability during deployment by a high-temperature gas. The gas is preferably blocked to such an extent as not being observed, but in view of balance with other characteristics, the lower limit of the air permeability is 10 cc/cm²/sec. The air permeability under a pressure of 200 kPa at ordinary temperature is more preferably from 20 to 180 cc/cm²/sec, still more preferably from 50 to 180 cc/cm²/sec.

In the weaving yarn on the surface of the fabric of the present invention, with respect to the maximum width W (mm) of an area where warp and weft yarns are woven and filaments of the weaving yarn are aligned, it is preferred that the widening ratio R(f) of the weft yarn is from 90 to 120%, the widening ratio W(w) of the warp yarn is from 105 to 135%, and the total widening Ws is from 0 to 40%.

$$\text{Widening ratio } R(f) = \{W(f)/(25.4/D(f))\} \times 100$$

$$\text{Widening ratio } R(w) = \{W(w)/(25.4/D(w))\} \times 100$$

$$\text{Total widening } Ws = R(f) + R(w) - 200.$$

In the above, W(f) is the maximum width (mm) of the weft yarn, W(w) is the maximum width (mm) of the warp yarn, D(f) is the weave density (yarns/25.4 mm) in the weft direction, and D(w) is the weave density (yarns/25.4 mm) in the warp direction.

The widening ratio is the percentage of the maximum weaving yarn width observed on the fabric surface, based on the weaving yarn pitch calculated from the weave density. The total widening is obtained by totalizing the widening ratios in the warp and weft directions and indicates the inflation beyond the weaving yarn pitch. When the total widening Ws is 0 or more, for the entire fabric, widening of the weaving yarn leads to overlapping of fibers blocking the passing of gas and the air permeability can be reduced. As both the total widening Ws and the widening ratio R are larger, the air permeability are more reduced. Also, when the total widening Ws is 40% or less, there is no fear that the filaments other than the widened filaments sag and the air permeability under high pressure is rather increased. The total widening Ws is preferably from 2 to 30%. When the widening ratio R(w) of the warp yarn is 105% or more, the warp yarns are unfailingly overlapped with each other and the passing of air is blocked. When the widening ratio R(w) of the warp yarn is 135% or less, there is no fear that the filaments other than the widened filaments sag and the air permeability under high pressure is rather increased. The widening ratio R(w) of the warp yarn is more preferably from 110 to 130%. When the widening ratio R(f) of the weft yarn is 90% or more, low air permeability results. When the widening ratio R(f) of the weft yarn is 120% or less, there is no fear that the filaments other than the widened filaments sag and the air permeability under high pressure is rather increased. The widening ratio R(f) of the weft yarn is more preferably from 93 to 110%. Due to the weaving yarn configuration where the weaving yarns on the fabric surface are overlapped and the above-described widening ratio and total widening are satisfied, the air permeability can be reduced and the air permeability under high pressure of the fabric can be made low.

The widening ratio or total widening may be increased by increasing the weave density by the fabric design, and furthermore, appropriately applying shrinking processing after weaving to increase the warp-weft weave density in a balanced manner. In the case of using a twisted yarn for the weaving yarn in the weaving step, a high-density fabric is liable to be woven due to gathering and bundling particularly of single filament in warp yarns, but good bundling of filaments on the fabric surface reduces the widening ratio or the total widening. Accordingly, it is preferred that the weaving yarn in the fabric is substantially not twisted. That is, slight loose twisting caused when taking out the yarn from a package is usually present in the weaving yarn at a frequency of less than 10 twists/m, but the weaving yarn is preferably used without applying any more intentional twisting. Furthermore, when air entanglements are applied to the weaving yarn in the yarn-making step or the like, the single filament can be prevented from breaking due to disentangle of filaments during handing of the weaving yarn, but good bundling of filaments on the fabric surface reduces the widening ratio or total widening. Accordingly, it is preferred that the entanglements are substantially eliminated when the yarn is processed into a fabric. In the raveled yarn from the fabric, no entanglements are preferably observed by the water surface observation method. Accordingly, the entanglements of the weaving yarn original yarn used for the fabric are preferably from 1 to 15 entanglements/m, more preferably from 1 to 10 entanglements/m.

In the tensile test of the fabric of the present invention, the total value of such elongation in the warp direction as letting the load per one yarn constituting the fabric become 4.0 cN/dtex (hereinafter, referred to as a specific load-elongation) and that in the weft direction is preferably from 40.0 to 58.0%. When the total of the specific load-elongation in the tensile test of the fabric is 58.0% or less and as smaller, air permeability of the fabric when an expansion stress is imposed by gas is more successfully kept low. The total of the specific load-elongation is more preferably from 45.0 to 54.0%, still more preferably from 51.0% or less. For reducing the total of the specific load-elongation in the tensile test of the fabric, the elongation under a load of 4.0 cN/dtex in the tensile test of the original yarn fiber constituting the weaving yarn for both the warp and weft yarns is preferably small and 15% or less. The elongation is more preferably 13% or less. Furthermore, in the heatsetting after the weaving of the fabric, the fabric may be cooled and fixed by appropriately keeping a strain in each of the warp and weft direction. When the total of the specific load elongation in the tensile test of the fabric is 40.0% or more, the fabric does not become coarse and hard. In the original yarn fiber constituting the fabric, the elongation under a load of 4.0 cN/dtex in the tensile test is preferably 5% or more, more preferably 7% or more.

In the present invention, the thermal stress determined by measuring the fiber constituting the fabric under the conditions of an initial load of 0.02 cN/dtex, a sample length of 25 cm and a temperature rise rate of 80° C./min is preferably from 0.005 to 0.10 cN/dtex at 120° C. in both the warp yarn and the weft yarn. Also, in the thermal stress at 230° C. measured under the same conditions, the summed thermal stress of the total of the warp yarn and the weft yarn is preferably from 0.33 to 1.20 cN/dtex. When the thermal stress at 120° C. is 0.10 cN/dtex or less and is low, the fabric during storage of the airbag exhibits good dimensional stability in a high-temperature environment. The thermal stress is more preferably 0.05 cN/dtex or less. Due to such thermal stress, the air permeability in the sewn part is kept from increasing due to generation of wrinkling in the sewn part. The thermal stress at 120° C. for being thermally stable is substantially 0.005 cN/dtex or more. When the summed thermal stress at 230° C. is as high as 0.33 cN/dtex, the air permeability of the fabric upon generation of an expansion stress at a high temperature during deployment of the airbag can be kept low. In turn, gas leakage during deployment by a high-temperature gas is reduced. When the summed thermal stress at 230° C. is 1.2 cN/dtex or less, there is no fear that the thermal stress at 120° C. becomes excessively high. The summed thermal stress at 230° C. is more preferably from 0.35 to 1.00 cN/dtex.

The thermal stress at 120° C. can be reduced by selecting the high-temperature stretching conditions for the stretching conditions of the polyamide yarn. The thermal stress can be also reduced by selecting proper shrinkage in the scouring and heatsetting after the weaving of the fabric. For example, in the case of a weaving original yarn having a high shrinkage percentage, the thermal stress can be reduced mainly by thermal shrinkage in the high-temperature scouring or the like, but this involves reduction in the entire thermal stress including the thermal stress at a high temperature of 230° C. and therefore, the shrinkage conditions must be balanced. Also, in the case of a weaving original yarn having a low shrinkage percentage, the thermal stress at a low temperature is small and shrinkage in a scouring step or the like may be omitted, but on the other had, there is a fear that the thermal stress at a high temperature becomes excessively small.

The thermal stress at 230° C. can be reduced by selecting the cooling conditions after thermal stretching for the stretching conditions of the polyamide yarn. That is, the yarn-making may be performed by stepwise decreasing the processing temperature condition to about 150° C. from the thermal drawing temperature and in the course of this temperature drop, stepwise reducing the thermal tension at an elongation/relaxation rate. The conditions of scouring after the weaving of the fabric should be appropriately selected so as not to significantly impair the thermal stress, and it is rather preferred to perform no scouring. Also, the subsequent heatsetting of the fabric may be performed at a temperature of preferably from 120 to 200° C. while keeping the strain without relieving the tension, and immediately after the heat treatment, the fabric may be cooled while appropriately keeping the strain in each of the warp and weft directions of the fabric without relieving the tension.

In the yarn constituting the fabric of the present invention, the initial rigidity, that is, the stress, at an elongation of 2.5% in the tensile test is preferably from 0.10 to 1.00 cN/dtex. When the initial tensile modulus is as small as 1.00 cN/dtex or less, the fabric is insusceptible to a folding habit (pleat) and liable to be avoided from having a trigger to rupture of the airbag. For keeping the initial tensile modulus of the yarn constituting the fabric small, a fiber composed of an aliphatic polyamide resin, which is a fiber by a direct spinning and drawing method, is used. Furthermore, in the textile processing, it is preferred to avoid applying a strain under such conditions as allowing development of shrinkage in the scouring or heatsetting or not to perform scouring or heatsetting.

The fabric of the present invention preferably contains from 10 to 500 ppm of a copper element and also preferably contains from 100 to 3,500 ppm in total of iodine and/or bromine elements. These are contained as a thermal stabilizer for the polymer molecule of the polyamide to enhance the long-term heat resistance. The content of the copper element is more preferably from 15 to 300 ppm, more preferably from 20 to 200 ppm, and most preferably from 30 to 100 ppm. The content in total of the iodine and/or bromine elements is more preferably from 150 to 3,000 ppm, more preferably from 200 to 2,500 ppm, and most preferably from 250 to 2,000 ppm. The copper element exerts an action of scavenging a radical originated from cleavage of the molecular chain of the polyamide polymer. When the copper element is 10 ppm or more and as larger, the long-term heat resistance of the polyamide polymer can be expected to be enhanced. Accordingly, the airbag after thermal aging can be avoided from bursting or rupture at the deployment by gas. When the copper element is 500 ppm or less, this is profitable, and a trouble such as accumulation of an inorganic deposit in the spinning step is hardly caused. The iodine and/or bromine elements are used to let the copper repeatedly develop its radical scavenging action and thereby maintain the thermal stabilization effect by the copper.

The copper element is added as a copper compound to the polyamide polymer. Specific examples of the copper compound include cuprous chloride, cupric chloride, cupric bromide, cuprous iodide, cupric iodide, cupric sulfate, cupric nitrate, copper phosphate, cuprous acetate, cupric acetate, cupric salicylate, cupric stearate, cupric benzoate, and a complex compound of the inorganic copper halide above with xylylenediamine, 2-mercaptobenzimidazole or benzimidazole. In particular, addition of a monovalent copper halide compound composed of a combination of a copper compound and a halogen is more preferred, and specific preferred examples of the compound added include cuprous acetate and cuprous iodide.

The iodine and/or boron elements can be added as an alkali halide compound. Examples of the alkali halide compound include lithium bromide, lithium iodide, potassium bromide, potassium iodide, sodium bromide and sodium iodide. The iodine and/or bromine elements are added to regenerate the function of the copper by an oxidation-reduction reaction when the copper contributes to radical scavenging, and the content of these elements is preferably 100 ppm or more, more preferably 300 ppm or more. As the content is larger, the long-term heat resistance of the polyamide polymer can be expected to be enhanced. On the other hand, when the content is 3,500 ppm or less, yellowing due to liberation of iodine in a general environment can be avoided.

The content of the iron element contained in the fabric of the present invention is preferably from 0.01 to 20 ppm, more preferably from 0.05 to 10 ppm, still more preferably from 0.1 to 5 ppm. When the content of the iron element is 20 ppm or less and as smaller, the polyamide and polyamide oligomer component are limited from oxidative decomposition, and holding the heat resistance by the copper and the halogen compound can be more effectively enjoyed. Then, Oxidative decomposition of the polyamide after thermal aging is limited, and reduction in the mechanical properties is suppressed. In turn, the airbag base cloth subject to an increasing load when performing the deployment in a highly airtight manner after thermal aging is not ruptured, and the reliability can be more enhanced. The iron element is incorporated into the polyamide polymer in the spinning and filtration step where out of the polymerization and spinning step, the temperature is highest and the metal contact area is large. An alloy material having a small iron content, such as nickel alloy (e.g., Hastelloy (trademark)), is preferably employed for the metal nonwoven fabric used in a spinning filter. The content of the iron element in the polyamide yarn is industrially 0.01 ppm or more.

The fabric of the present invention preferably contains from 0.1 to 100 ppm in total of any one or all of zinc, aluminum and magnesium elements. The content of these elements is more preferably from 0.5 to 50 ppm, still more preferably from 1.0 to 30 ppm, and most preferably from 5.0 to 20 ppm. When the fabric contains 0.1 ppm or more in total of zinc, aluminum and magnesium elements, even in a high-temperature environment or a high-humidity environment, the fabric composed of the polyamide fiber can be kept from reduction in the physical properties due to deterioration of the polyamide fiber. When the total content of zinc, aluminum and magnesium elements in the polyamide yarn is 100 ppm or less, a spinning failure due to addition of an additive containing the element above to the polyamide yarn, that is, a fabric defect of the polyamide yarn fabric due to yarn breaking or single filament breaking, can be avoided. Furthermore, the total amount of zinc, aluminum and magnesium elements preferably exceeds the amount of the iron element. Also, out of three elements, the content of the aluminum element is preferably the principal amount and accounts for 40% or more, more preferably 60% or more.

In the fabric of the present invention, the zinc, aluminum and magnesium elements contained in the polyamide yarn are preferably incorporated by spinning yarns with the addition of a fatty acid metal salt to the polyamide polymer. The fatty acid metal salt added to the polyamide polymer is preferably a metal salt of a fatty acid having a carbon number of 6 to 40, and specific examples thereof include aluminum montanate, magnesium montanate, zinc montanate, aluminum stearate, magnesium stearate, and zinc stearate. Among these, aluminum montanate, magnesium montanate and zinc montanate can be preferably used. Such a fatty acid metal salt has little action for thermal deterioration of the polyamide polymer, facilitates obtaining a high-strength fiber due to its nucleating effect, contributes to enhancement of seam tenacity of the fabric resulting from improved uniformity of physical properties of the fiber, and particularly contributes to enhancement of seam tenacity of the fabric after thermal aging. In turn, the thermally aged airbag can be prevented from bursting. In the present invention, one kind of the above-described aliphatic metal salt may be used, or two or more thereof may be used in combination.

In the fabric of the present invention, the polyamide oligomer is preferably controlled to an appropriate content. For this purpose, it is preferred to appropriately control the polyamide oligomer content during spinning into a polyamide fiber. In particular, the fabric preferably contains a cyclic unimer where a hexamethylenediamine and an adipic acid are circularly condensed one by one, in an amount of 0.1 to 3.0%, more preferably from 0.5 to 2.5%, based on all amide bond units. The cyclic unimer as used herein is a compound represented by the following formula (1):

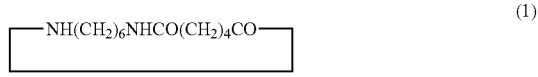

(1)

Among polyamide oligomers, the cyclic unimer has a low molecular weight and is cyclic, which are effective for slowly bleeding out to the fiber surface while keeping the plasticization effect. Furthermore, the cyclic unimer is kept from being thoroughly extracted by a water treatment or the like, and this is advantageous in view of fabric processing.

The cyclic unimer improves slipperiness of the polyamide yarn and maintains the flexibility of the fabric. When the proportion of the cyclic unimer component in the polyamide compound is 0.1% or more, even after passing through a high-temperature environment, the fabric is allowed to maintain good retention of its tear tenacity by the slow bleed out of the cyclic unimer component. Similarly, the fabric after passing through a high-temperature environment is prevented from increase of friction and keeps good slipperiness. Furthermore, the fabric successfully keeps the flexibility without becoming coarse and hard due to plasticization effect. Accordingly, the fabric after thermal aging does not become coarse and hard but maintains the airtightness without promoting gas leakage through the seam and at the same time, causes no reduction in the deployment rate of the airbag.

When the proportion of the cyclic unimer in the amide compound is 3.0% or less, the fabric after passing through a high-temperature environment is kept from excessive reduction in the sliding resistance and deterioration of the pressure resistance as an airbag.

As for the cyclic unimer, it is preferred to appropriately add the cyclic unimer during spinning into a polyamide fiber. An oligomer obtained as a sublimation material powder from a polyamide 6•6 molten polymer is purified by recrystallization, whereby an oligomer comprising a cyclic unimer as the main component can be obtained.

Also, the cyclic unimer is finely dispersed by the fatty acid metal salt and thereby contributes to enhancement of mechanical properties of the polyamide fiber. This effect of the cyclic unimer is not inhibited by the zinc, aluminum and magnesium elements but rather exerts the effect in combination with such an aliphatic metal salt.

The proportion of the cyclic unimer component in the amide compound is determined by dissolving the fabric in an NMR solvent and performing a 13C-NMR spectral analysis. For example, in the case of a polyamide 6•6 polymer, the spectral analysis fundamentally followed the Davis proposal (R. D. Davis, et al., *Macromolecules* 2000, 33, 7088-7092). The carbon at the β-position with respect to the amide nitrogen bonding site of the hexamethylenediamine skeleton in the polyamide 6•6 polymer exhibits three kinds of chemical shifts, that is, (1) carbon in a cyclic unimer, (2) carbon in the trans conformation in a chain polyamide and carbon in a cyclic polyamide except for a cyclic unimer, and (3) carbon in the cis conformation in a chain polyamide. The NMR peak intensity of (1) is determined by percentage (%) based on the total of peak intensities of (2) and (3) and taken as the proportion of the cyclic unimer in the polyamide compound. In the case where the spectrum of the finish oil component of the fiber is overlapped in the NMR spectrum, the spectrum may be analyzed by comparison after removing the finish oil component of the yarn by extraction with an organic solvent.

In the polyamide fabric of the present invention, the content of the finish oil component is preferably from 0.01 to 2.0 wt %, more preferably from 0.05 to 1.5 wt %, still more preferably from 0.1 to 0.7 wt %. The finish oil component as used herein is a component extracted from the fabric with an organic solvent hexane, and the content thereof is the percentage of the weight of the extract based on the weight of the polyamide fabric. When the content of the finish oil component is 0.01 wt % or more, tear tenacity of the fabric base cloth can be maintained and enhanced. In particular, the surfactant component in the finish oil component assists in bleeding out the cyclic unimer of the polyamide yarn, appropriately promotes slip of yarn with each other due to integration of the cyclic unimer and the finish oil component on the polyamide yarn surface and contributes to maintaining and enhancing the tear tenacity after passing through a high-temperature environment. That is, as the airbag fabric, the gas pressure resistance during deployment can be expected to increase and therefore, the surfactant component contributes to burst prevention during deployment. The surfactant component also greatly suppresses the increase of fabric friction and therefore, contributes also to inhibiting delay of the deployment time. With only the finish oil component, the effect of maintaining and enhancing the tear tenacity in a high-temperature environment is gradually lost. However, due to the integration with the cyclic unimer, the effect is more successfully maintained.

When the content of the finish oil component is 2.0 wt % or less, the airbag fabric is not rejected in the burning property test (FMVSS302).

The finish oil component may be a remaining component derived from the process finish oil applied in the fiber production step and the weaving process step.

Other than those described above, within the range not impairing the effects of the present invention, the original yarn may contain various additives usually used for improving the productivity or characteristics in the production step or processing step of the original yarn. For example, a thermal stabilizer, an antioxidant, a light stabilizer, a lubricating agent, an antistatic agent, a plasticizer, a thickener, a pigment and a flame retardant may be incorporated.

In the fabric of the present invention, the polyamide yarn may be woven into a fabric by a waterjet loom, an airjet loom, a rapier loom, a multiphase weaving machine or the like. As for the fabric texture, a fabric such as plain fabric, twill fabric, satin fabric, variation or combined texture fabric thereof, and multiaxial fabric are used, and among these, a plain fabric is preferred because of its excellent mechanical properties and thinness. A double woven fabric capable of weaving a bag may be also used.

In the weaving, a finish oil component may be applied to a warp yarn or the like for enhancing the gathering and bundling property. The finish oil component applied here may be finally contained in the airbag fabric.

Subsequently, scouring and washing may be performed to remove excessive finish oil component or contamination. In the scouring step, alkali washing or surfactant washing is performed in a warm water bath, but in the present invention, cares must be taken not to remove zinc, aluminum and magnesium elements and furthermore, the cyclic unimer and the like. Rather, the fabric is preferably finished into an airbag fabric without performing the scouring. More preferably, a fabric having an appropriate amount of the finish oil component after mostly eliminating the finish oil component by a waterjet loom is finished into an airbag fabric without passing through scouring. This facilitates control of the amount of contents necessary for the present invention and is profitable. A warping finish oil or a finish oil of the weaving step, where a lubricating agent and an antistatic agent are the main component, is preferably contained in the final fabric.

In the scouring step, for decreasing the thermal stress at 120° C. of the weaving yarn constituting the fabric, the scouring is preferably performed by raising the scouring temperature. On the other hand, for keeping high the thermal stress at 230° C. of the weaving yarn constituting the fabric, it is preferred to select an appropriate scouring temperature or not perform the scouring. The conditions may be appropriately selected according to the property, particularly the shrinkage percentage, of the weaving yarn original yarn.

The fabric can be then finished into an airbag fabric through drying and heatsetting. In the drying and heatsetting of the fabric, with respect to each of the fabric width and feeding in the warp direction, the shrinkage amount and tension are preferably controlled. For example, a tenter is used. For keeping high the thermal stress at 230° C. of the weaving yarn constituting the fabric, it is preferred to select the heat treatment temperature and process the fabric by a heat treatment while applying a tension without leaving the fabric to shrink. After the heat treatment, the fabric is preferably cooled rapidly while applying a tension. In the case of using a low shrinkage yarn as the weaving yarn, non-setting is also preferred so as to maintain the thermal stress at 230° C.

For reducing the weight of the airbag, the airbag fabric of the present invention is preferably used for the airbag with substantially no coating of a resin or an elastomer. The fabric may be finally applied to a calendering process, but since reduction in the tear tenacity must not be incurred, the fabric may be preferably used without applying a calendering process.

The airbag fabric of the present invention is cut and sewn and then may be appropriately used for a driver's seat airbag, a passenger seat airbag, a backseat airbag, a side airbag, a knee airbag, an airbag between car seats, a side curtain airbag, a rear window curtain airbag, a pedestrian protection airbag and the like. In the airbag, the reinforcing cloth used for an inflator fixing port, a vent hole portion and the like or the member regulating the deployment shape of bag may be the same fabric as the airbag fabric. Also, in sewing the airbag, one sheet of the airbag fabric piece formed by punching, fusion (heat-cutting) or cutting (cloth-cutting) or a plurality of such sheets are used, and the peripheral edges thereof are sewn, whereby an airbag can be formed. Furthermore, an airbag where the sewing of the peripheral edges is composed of single or double seam sewing may be also formed.

The fabric of the present invention can be used as an airbag by weaving it as a bag fabric and cutting the outer periphery of the binding part.

The airbag module of the present invention is preferably an airbag module obtained by combining the above-described airbag and an inflator using an explosive or a propellant.

EXAMPLES

The present invention is described in greater detail below by referring to Example and Comparative Examples, but the present invention is not limited only to these Examples.

In Examples, the characteristic evaluation and the like of the airbag fabric were performed by the following methods.

(1) Basis Weight of Fabric:
Measurement was performed using a sample of 10 cm×10 cm in accordance with JIS L1096, Appendix 3.

(2) Total Yarn Fineness of Raveled Yarn:
Warp and weft yarn raveled from the fabric were measured by setting the sample length to 25 cm in accordance with JIS L1096, Appendix 14.

(3) Tensile Characteristics of Raveled Yarn:
The yarns were inserted twists at 20 wists/25 cm, and a tensile test was performed with a chuck distance of 25 cm at a stretching speed of 30 cm/min in accordance with JIS L1013 8.5.1. As for the specific load-elongation (%) of the raveled yarn, the elongation under a load of 4.0 cN/dtex was read. Also, as for the initial tensile modulus, the stress (cN/dtex) per total yarn fineness at an elongation of 2.5% was read.

(4) Number of Filaments of Raveled Yarn:
The number of constituent filaments was counted on the cross-sectional photograph of the fabric.

(5) Thermal Stress of Raveled Yarn:
Measurement was performed using CORD RHEOTESTER manufactured by Toyo Seiki Seisaku-Sho, Ltd. As for the temperature rise profile, the initial load was 0.02 cN/dtex, the sample length was 25 cm, and the temperature rise was set such that in the EXP. mode, the initial temperature was 20° C. and the achieving temperature of 250° C. was achieved in 3 minutes. That is, the temperature rise rate was about 80° C./min. The stress was determined at the point of 120° C. and 230° C.

(6) Entanglements of Raveled Yarn:
Entanglements was observed by letting the raveled yarns float on the surface of fresh water.

(7) Number of Twists of Raveled Yarn:
The number of twists of the raveled yarn was measured with a chuck width of 20 cm by using a twist counter in accordance with JIS L1096, Appendix 13 and converted into the number of twists per m.

(8) Shrinkage in Boiling Water of Raveled Yarn:
The shrinkage in boiling water of the raveled yarn having a length of 25 cm was measured in accordance with JIS L1013 8.18.1 (Method B).

(9) Cover Factor (CF):
This was determined according to the following formula:

$$CF=(Dw)^{1/2} \times Tw+(Df)^{1/2} \times Tf \quad (1)$$

(wherein Dw is the total yarn fineness (dtex) of the raveled yarn in the warp direction, Df the total yarn fineness (dtex) of the raveled yarn in the weft direction, Tw is the weave density (yarns/2.54 cm) of the warp yarn, and Tf is the weave density (yarns/2.54 cm) of the weft yarn).

(10) Air Permeability by FRAZIER Method:
This was measured by JIS L 1096 8.27.1 Method A.

(11) Air Permeability Under High Pressure:
The air permeability under 200 kPa was determined by drawing a wet-up/dry-up air permeation curve from an air pressure of 0 to an air pressure of 200 kPa with the immersion solution GalWick by using Capillary Flow Porometer CFP-1200AEX (manufactured by Porous Metrials, Inc.).

(12) Tensile Strength and Elongation of Fabric:
The measurement was performed in accordance with JIS L1096 8.12.1 Method A (strip method). As for the specific load-elongation (%) of the fabric, in the obtained stress-strain curve, the stress was converted into a stress per one raveled yarn based on the weave density and the fineness of raveled yarn, and the elongation under a load corresponding to 4.0 cN/dtex was determined.

(13) Weave Density:
The measurement was performed in accordance with JIS L1096, Appendix 11A. A densimeter was used.

(14) Measurement of Fabric Surface:
A surface photograph was taken by SEM, and the dimension of the maximum width of the flared weaving yarn was measured. The average value of at least 20 or more measurement points was determined and out of front and back surfaces, the larger value was employed as the maximum width W (mm) of the weaving yarn.

(15) DSC of Fabric:
The fabric sample was punched into a round shape of 6 mmφ that is almost the same as the bottom size of the pan for DSC measurement, weighed, lay on the bottom of the measurement pan, and swaged to the cover of the pan. The melting peak was observed at a temperature rise rate of 20° C./min. An endothermic peak appears in a shoulder shape before the crystal melting peak near 260° C., and the temperature at which the peak rises from the base line was taken as the melting initiation temperature. The area of the entire endothermic peak combining the crystal melting peak and the shoulder part, from the base line was taken as the heat of melting (J/g). DSC7 manufactured by PERKIN-ELMER was used.

(16) Quantitative Analysis of Metal:
The fabric sample in an amount of about 0.2 g was sampled in a Teflon (registered trademark)-made closed digestion vessel, and 5 ml of high-purity nitric acid of analysis grade was added. Under the digestion pressure of 200° C.×20 minutes it was performed by a microwave digestion apparatus (ETHOS TC manufactured by Milestone General K.K.), and it was confirmed that the sample was completely digested and turned into a colorless and transparent solution. The volume was fixed to 50 ml with ultrapure water to obtain a quantitative analysis solution, and the quantitative determination was performed by an internal standard method using an ICP mass analyzer (X Series X7 ICP-MS manufactured by Thermo Fisher Scientific K.K.). The quantitative detection limit of copper and magnesium elements was 0.03 ppm, and the quantitative detection limit of each of iron, zinc and aluminum elements was 0.01 ppm.

(17) Quantitative Analysis of Iodine:

As the pretreatment, about 50 mg of the fabric sample was burned in a flask enclosing oxygen, and iodine in the sample was absorbed by 20 mL of an aqueous 0.01 N sodium hydroxide solution. This solution is used as the test solution for measurement. In the quantitative analysis measurement, the quantity was determined from the calibration curve of iodine by an internal standard method with indium (In) by using an ICP mass analyzer, X Series X7 ICP-MS, manufactured by Thermo Fisher Scientific K.K. The quantitative detection limit value was 0.5 ppm.

As for the quantitative determination of bromine, the quantity can be determined, for example, by using an ion chromatographic apparatus, 2000i/sp, manufactured by Nippon Dionex K.K. The quantitative detection limit value is 20 ppm. In all of Examples, the quantity was below the detection limit.

(18) Finish Oil Component of Fabric:

The fabric sample in an amount of 10 g was subjected to Soxhlet extraction with 300 ml of n-hexane for 8 hours. From the dry weight of the n-hexane extract, the amount (wt %) of the finish oil component in the sample was determined.

(19) Cyclic Unimer:

The fabric was dissolved in an NMR solvent and measured by $^{13}$C-NMR. The solution was completely dissolved and measured without adjusting the pH. The $^{13}$C-NMR spectrum was measured using an NMR apparatus, AVANCE(II) Model 400, manufactured by BRUKER under the following conditions.

NMR Conditions:
    Sample concentration: 100 mg/0.8 ml-NMR solvent
    NMR Solvent: hexafluoroisopropanol-d2
    Measurement temperature: 25° C.
    Pulse repetition interval: 2 seconds
    Cumulated number: 18,000 times
    Chemical shift basis: The peak of branching center, which becomes the peak top of methine carbon of hexafluoroisopropanol-d2, was set to 71.28 ppm. With respect to the obtained polyamide 6•6 and the cyclic unimer contained, the peak assignment of carbon (C2) located in β-position from nitrogen-bonded site is shown in Table 1.

TABLE 1

| Assignment | Chemical Shift (ppm) | Calculation Range (ppm) |
|---|---|---|
| Chain carbon: 2 | 30.5 | 0.4 |
| Chain carbon: 2cis | 31.5 | 0.2 |
| Cyclic unimer carbon: C2 | 29.1 | 0.2 |

As for the cyclic unimer component ratio (A), the percentage was calculated according to the following formula (2) from the peak intensities I each obtained by integrating the peaks in the calculation range:

$$A = \{I(C2)/(I(2)+I(2cis))\} \times 100 \quad (2)$$

(20) Production of Airbag:

The airbag described in International Publication No. 99/28164, pamphlet was sewn. However, for the outer peripheral sewing, a two-row double-thread chain stitch with a sewing thread of 235 dtex/2×3 and a stitch number of 5.0 stitches/cm was employed. A vent hole was not provided. The obtained airbag was inserted a retainer and subjected to airbag folding described in International Publication No. 01/9416, pamphlet, and an inflator was fixed. Subsequently, while not collapsing the shape of the folded airbag, an loop cloth, which was obtained by sewing the same 3 cm-wide fabric as the airbag with a basting yarn into an loop shape, was put entirely around the folded airbag and the inflator by arranging the basting portion to face the front.

(21) Deployment of Inflator:

An inflator of a pyro type having a 28.3 L tank pressure of 210 kPa as an output was used. The airbag was secured to inflator with retainer, and the pressure inside the airbag was observed from the retainer bolt portion, and how the inflator is deployed was also observed using a high-speed video. The maximum deployment pressure near the maximum diameter of deployment by inflator ignition was read as the inflator deployment pressure (kPa). Also, the assembled airbag was treated at 120° C. for 1,000 hours and thereafter, the maximum deployment pressure near the maximum diameter of deployment by inflator ignition was read and taken as the inflator deployment pressure (kPa) after thermal aging.

(22) Close Proximity Deployment:

A baffle plate was provided at the position of 10 cm in front of the airbag, and how the inflator is deployed was observed using a high-speed video. The ruptured state after deployment was also checked, and the airbag ruptured upon production of a melted hole was judged as fusion rupture. Also, after treating the assembled airbag at 120° C. for 1,000 hours, similarly, a baffle plate was provided, how the inflator is deployed was observed using a high-speed video, and the bag after deployment was observed.

(23) Heat Resistance of Deployment Characteristics (Ratio of Deployment Time Between Before and after Heat Treatment):

The airbag described in International Publication No. 99/28164, pamphlet, was sewn. However, for the outer peripheral sewing, a two-row double-thread chain stitch with a sewing thread, both the upper thread and lower thread, of 235 dtex/2×3 and a stitch number of 5.0 stitches/cm was employed. An inflator with a tank pressure of 200 kPa was mounted, and a deployment test was performed at ordinary temperature. The time until the front deployment area reached 98% of the maximum deployment area in the high-speed VTR observation was taken as the deployment time. The ratio (%) of change in the deployment time between before and after a treatment at 140° C. for 500 hours was determined.

(24) Heat Resistance of Dimensional Stability (Heat-Resistant Dimensional Stability):

The outer peripheral size of the bag sewn above was compared between before and after a treatment at 140° C. for 500 hours, and the bag undergoing a change of 5% or more was judged as rejected.

(25) Deployment Characteristics Under Cold Conditions (Ratio of Deployment Time Under Cold Conditions):

The airbag module was treated at 140° C. for 500 hours, then placed in a tank at −35° C. overnight and thereafter, deployed by quickly connecting an ignition device, and the ratio (%) of change from the deployment time at ordinary temperature before the heat treatment was determined.

(26) Fabric Burning Test:

Measurement was performed in accordance with FMVSS302. The sample where the burning rate was 102 mm/min or less was judged as passed. Furthermore, when the burning time was 60 seconds or less or the burned length was 51 mm or less, the sample was evaluated as passing the self-extinguishing property, i.e., self-extinguishing flame resistance.

Example 1

Sodium hypophosphite as a polymerization catalyst was added to an aqueous solution containing a neutralized salt of hexamethylenediamine and adipic acid, and condensation polymerization was performed in a continuous polymerization apparatus. Subsequently, an aqueous solution of copper iodide/potassium iodide as the thermal stabilizer was added and after passing through post polymerization, a resin chip was formed. Thereafter, a polyamide 6•6 resin having a relative viscosity $\eta r$ of 3.1 was obtained by solid phase polymerization. The iron element content of this polyamide 6•6 resin was 0.12 ppm. At the time of melt-spinning the polyamide 6•6 resin by a melt extruder, cyclic unimer and aluminum montanate were added. For the filter of the melt-spinning machine, a metal nonwoven filter (average pore size: 15 microns) composed of Hastelloy C22 was used. Furthermore, the thread discharged was applied with a spin finish oil component and thermally drawn to obtain a polyamide 6•6 fiber. For the spin finish oil, a composition containing 60 parts by weight of dioleyl thiodipropionate, 20 parts by weight of hydrogenated castor oil EOA (molecular weight: 2,000) stearate and 20 parts by weight of higher alcohol EOPO adduct (molecular weight: 1,500) was used. The number of entanglements was 7/m.

The thus-obtained filament yarn having a fineness of 470 dtex, a filament number of 72 and a single filament fineness of 6.5 dtex was neither twisted nor sized and used to obtain a plain fabric in a waterjet room. Subsequently, without scouring, the fabric was dried by hot air at 80° C. and heatset by subjecting the fabric to heating at 180° C. for 1 minute with an overfeed of 2% for both warp and weft directions by the use of a pin tenter and then to quenching. An airbag fabric where both the weave density of warp yarn and the weave density of weft yarn are 55 yarns/2.54 cm was obtained.

The total yarn fineness of the multi filament yarn (raveled yarn) constituting this airbag fabric, and the tensile tenacity, elongation at break, weave density, air permeability and amount of finish oil component of the fabric are shown in Table 2. Similarly, the amounts of cyclic unimer, copper element, halogen element (iodine), iron element, magnesium element, aluminum element and zinc element contained in the airbag fabric are shown in Table 2.

An airbag was sewn from the airbag fabric and after fixing an inflator, evaluated for the inflator deployment pressure. Also, the airbag was exposed to 120° C. for 1,000 hours and evaluated for the inflator deployment pressure after thermal aging. Furthermore, the presence or absence of a rupture by a hot particle in the close proximity deployment was evaluated by observing the deployment. The results obtained are also shown in Table 2.

The inflator deployment pressure was sufficient without no loss of the deployment gas and the inflator deployment pressure after thermal aging was on the same level and sufficient. A rupture by a hot particle due to an inflator residue was not generated.

Example 2

The production and evaluation were performed in the same manner as in Example 1, except that a polyamide 6•6 fiber having a shrinkage in boiling water of 4.0% was used for the weaving yarn and neither scouring nor setting were performed after the weaving. The results are shown in Table 2. The inflator deployment pressure was sufficient without loss of the deployment gas and the inflator deployment pressure after thermal aging was on the same level and sufficient. A rupture by a hot particle was not generated.

Example 3

The production and evaluation were performed in the same manner as in Example 1, except that a polyamide 6•6 fiber having a fineness of 350 dtex, a filament number of 72, a single filament fineness of 4.9 dtex and a shrinkage in boiling water of 8.5% was used for the weaving yarn and after the weaving, the fabric was dried by hot air at 80° C., subsequently heated by a heat roll at 160° C. with an overfeed of 3% in feeding the fabric and then quenched. The results are shown in Table 2. The inflator deployment pressure was sufficient without loss of the deployment gas and the inflator deployment pressure after thermal aging was on the same level and sufficient. A rupture by a hot particle was not generated.

Example 4

The production and evaluation were performed in the same manner as in Example 3, except that a polyamide 6•6 fiber having a fineness of 350 dtex, a filament number of 144 and a single filament fineness of 2.4 dtex was used for the weaving yarn. The results are shown in Table 2. The inflator deployment pressure was sufficient without loss of the deployment gas and the inflator deployment pressure after thermal aging was on the same level and sufficient. A rupture by a hot particle was not generated.

Example 5

The production and evaluation were performed in the same manner as in Example 2, except for using a multi filament yarn which was spun without adding a cyclic unimer. The gas utilization efficiency was good, but after thermal aging for a long time, the maximum deployment pressure when deploying the airbag by a pyro-type inflator was slightly lower. A rupture by a hot particle was not generated.

Example 6

The production and evaluation were performed in the same manner as in Example 2, except that a metal nonwoven filter composed of SUS316L was used for the polymer filtration at the spinning and aluminum montanate was not added. The gas utilization efficiency was good, and a rupture by a hot particle was not generated. Under high-load conditions of performing close proximity deployment of the airbag after thermal aging for a long time, the fiber near the seam was partially broken but a rupture was not generated.

Example 7

The production and evaluation were performed in the same manner as in Example 1, except that a polyamide 6•6 fiber having a shrinkage in boiling water of 10.0% was used for the weaving yarn and after the weaving, at the heatsetting, the fabric without passing through scouring was heated at 120° C. for 1 minute with an overfeed of 0% for both warp and weft directions by the use of a pin tenter and then quenched. The results are shown in Table 2. The inflator deployment pressure was sufficient without loss of the deployment gas, but after thermal aging, sewing wrinkles were outstanding and the inflator deployment pressure was low. A rupture by a hot particle was not generated.

Comparative Example 1

The production and evaluation were performed in the same manner as in Example 1, except that after the weaving, the fabric was scoured in a scouring bath at 80° C. and in the subsequent heatsetting, heatset by subjecting the fabric to heating at 210° C. for 1 minute with an overfeed of 5% for both warp and weft directions by the use of a pin tenter and then to slow cooling. The results are shown in Table 2. The effect of thermal stress during deployment was insufficient, loss of the deployment gas occurred, the inflator deployment pressure was low, and the inflator deployment pressure after thermal aging was also low. A rupture by a hot particle was not generated.

Comparative Example 2

The production and evaluation were performed in the same manner as in Example 1, except that a polyamide 6•6 fiber to which 35 entanglements/m were imparted was used for the weaving yarn. The results are shown in Table 2. The weaving yarn coverage for the fabric surface was bad and the air permeability under high pressure was high. Accordingly, loss of the deployment gas occurred, the inflator deployment pressure was low, and the inflator deployment pressure after thermal aging was also low. A rupture by a hot particle was not generated.

Comparative Example 3

The production and evaluation were performed in the same manner as in Example 1, except that a polyamide 6•6 fiber twisted at a frequency of 100 twists/m was used for the weaving yarn. The results are shown in Table 2. The weaving yarn coverage for the fabric surface was bad and the air permeability under high pressure was high. Accordingly, loss of the deployment gas occurred, the inflator deployment pressure was low, and the inflator deployment pressure after thermal aging was also low. A rupture by a hot particle was not generated.

Comparative Example 4

The production and evaluation were performed in the same manner as in Comparative Example 2, except that a polyamide 6•6 fiber having a strength of 6.5 cN/dtex was used and after the weaving, in the heatsetting, the fabric was heatset by subjecting it to heating at 160° C. for 1 minute with an overfeed of 5% for both warp and weft directions by the use of a pin tenter and then to slow cooling. The results are shown in Table 2. The fabric was readily strained at the elongation under load, loss of the deployment gas occurred due to opening under high load, the inflator deployment pressure was low, and the inflator deployment pressure after thermal aging was also low. In the close proximity deployment, a rupture by a hot particle was not generated, but a seam rupture was generated.

Comparative Example 5

A plain fabric was woven in a waterjet room without sizing by using an untwisted weaving yarn which is a polyethylene terephthalate fiber having a fineness of 470 dtex/96f, a tensile strength of 7.0 cN/dtex, a tensile elongation at break of 22%, a shrinkage in boiling water of 0.9% and 15 entanglements/m. Subsequently, the fabric was scoured in a scouring bath at 80° C. and in the subsequent heatsetting, heatset by treating the fabric by a two-stage heat roll at 150° C. and 180° C. with an overfeed of 2% for warp feed and then quenching it. The evaluations of airbag deployment and the results thereof are shown together in Table 2. The initial rigidity of the raveled yarn by a tensile test was high and this is considered to contribute to reduction in the air permeability by the FRAZIER method. However, the summed specific load-elongation was large, as a result, the air permeability under high pressure of 200 kPa was not reduced, the summed thermal stress at 230° C. was low, and the pyro-inflator deployment pressure was low. Also, the thermal stress at 120° C. was high, and the air permeability at the inflator deployment pressure after thermal aging could not be kept low and was insufficient. Furthermore, a rupture by a hot particle was generated in close proximity deployment. In this bag, a folding crease clearly remained.

TABLE 2

|  |  |  | Example | | | | | | |
|---|---|---|---|---|---|---|---|---|---|
|  |  |  | 1 | 2 | 3 | 4 | 5 | 6 | 7 |
| <Original yarn> | Shrinkage in boiling water | % | 6.0 | 4.0 | 8.5 | 8.5 | 4.0 | 4.0 | 10.0 |
|  | Number of entanglements | entanglements/m | 7 | 7 | 7 | 7 | 7 | 7 | 7 |
|  | Number of twists | twists/m | 0 | 0 | 0 | 0 | 0 | 0 | 0 |
|  | Strength | cN/dtex | 8.2 | 8.6 | 8.5 | 8.2 | 8.6 | 8.6 | 8.2 |
|  | Elongation under load of 4.0 cN/dtex | % | 12.0 | 12.5 | 11.5 | 11.5 | 12.5 | 12.5 | 11.0 |
| <Processing conditions> | Scouring temperature | ° C. | none | none | none | none | none | none | none |
|  | Setting machine |  | pin tenter | — | heat roll | heat roll | — | — | pin tenter |
|  | Setting temperature | ° C. | 180 | — | 160 | 160 | — | — | 120 |
|  | Overfeed | % (warp/weft) | 2/2 | — | 3/— | 3/— | — | — | 0/0 |
|  | Cooling method |  | quenching | — | quenching | quenching | — | — | quenching |
| <Raveled yarn> | Total yarn fineness | warp, dtex | 502 | 470 | 385 | 383 | 470 | 470 | 488 |
|  |  | weft, dtex | 486 | 470 | 375 | 373 | 470 | 470 | 485 |
|  | Number of filaments | warp, filaments | 72 | 72 | 72 | 144 | 72 | 72 | 72 |
|  |  | weft, filaments | 72 | 72 | 72 | 144 | 72 | 72 | 72 |
|  | Single | warp, dtex | 7.0 | 6.5 | 5.3 | 2.7 | 6.5 | 6.5 | 6.8 |

TABLE 2-continued

|  |  |  |  |  |  |  |  |  |  |
|---|---|---|---|---|---|---|---|---|---|
|  | filament fineness | weft, dtex | 6.7 | 6.5 | 5.2 | 2.6 | 6.5 | 6.5 | 6.7 |
|  | Strength of raveled yarn | warp, cN/dtex | 7.8 | 8.3 | 8.0 | 7.7 | 8.3 | 8.3 | 7.1 |
|  |  | weft, cN/dtex | 7.3 | 8.4 | 6.9 | 7.9 | 8.4 | 8.4 | 7.6 |
|  | Elongation at break | warp, % | 18.9 | 21.5 | 24.5 | 23.1 | 21.5 | 21.5 | 19.0 |
|  |  | weft, % | 20.2 | 21.5 | 22.2 | 22.8 | 21.5 | 21.5 | 20.2 |
|  | Initial tensile modulus (stress at 2.5% elongation) | warp, cN/dtex | 0.32 | 0.40 | 0.51 | 0.54 | 0.40 | 0.40 | 0.33 |
|  |  | weft, cN/dtex | 0.70 | 0.62 | 0.60 | 0.68 | 0.62 | 0.62 | 0.65 |
|  | Specific load-elongation (elongation under load of 4.0 cN/dtex) | warp, % | 15.5 | 13.5 | 17.6 | 16.9 | 13.5 | 13.5 | 15.5 |
|  |  | weft, % | 13.2 | 13.0 | 15.9 | 15.4 | 13.0 | 13.0 | 13.5 |
|  | Shrinkage in boiling water | warp, % | 0.9 | 3.0 | 1.7 | 0.4 | 3.0 | 3.0 | 5.0 |
|  |  | weft, % | −1.8 | 3.0 | −2.3 | −2.3 | 3.0 | 3.0 | 6.5 |
|  | Number of entaglements | warp, entanglements/m | 0 | 0 | 0 | 0 | 0 | 0 | 0 |
|  |  | weft, entanglements/m | 0 | 0 | 0 | 0 | 0 | 0 | 0 |
|  | Number of twists | twists/m | 0 | 0 | 0 | 0 | 0 | 0 | 0 |
|  |  | twists/m | 0 | 0 | 0 | 0 | 0 | 0 | 0 |
|  | Thermal stress (120° C.) | warp, cN/dtex | 0.03 | 0.10 | 0.03 | 0.03 | 0.10 | 0.10 | 0.20 |
|  |  | weft, cN/dtex | 0.02 | 0.10 | 0.08 | 0.09 | 0.10 | 0.10 | 0.20 |
|  | Thermal stress (230° C.) | warp, cN/dtex | 0.18 | 0.25 | 0.17 | 0.19 | 0.25 | 0.25 | 0.50 |
|  |  | weft, cN/dtex | 0.25 | 0.25 | 0.21 | 0.20 | 0.25 | 0.25 | 0.52 |
|  |  | total, cN/dtex | 0.43 | 0.50 | 0.38 | 0.39 | 0.50 | 0.50 | 1.02 |
| <Fabric characteristics> | Fabric density | warp, yarns/inch | 55.0 | 55.0 | 63.5 | 59.0 | 55.0 | 55.0 | 55.0 |
|  |  | weft, yarns/inch | 55.0 | 55.0 | 61.0 | 59.0 | 55.0 | 55.0 | 55.0 |
|  | Widening ratio R(w) | warp, % | 125 | 110 | 109 | 115 | 110 | 110 | 114 |
|  | Widening ratio R(f) | weft, % | 99 | 95 | 93 | 96 | 95 | 95 | 95 |
|  | Total widening | Ws % | 25 | 5 | 3 | 12 | 5 | 5 | 9 |
|  | Cover factor (CF) | based on dtex | 2445 | 2385 | 2427 | 2294 | 2385 | 2385 | 2426 |
|  | Basis weight | g/m² | 219 | 217 | 193 | 179 | 217 | 217 | 219 |
|  | Melting initiation temperature by DSC | ° C. | 250.5 | 252.1 | 249.8 | 249.9 | 252.1 | 252.1 | 251.0 |
|  | Heat of melting by DSC | J/g | 78 | 78 | 78 | 78 | 78 | 78 | 78 |
|  | Air permeability by FRAZIER | cc/cm²/sec | 0.2 | 0.2 | 0.2 | 0.1 | 0.2 | 0.2 | 0.2 |
|  | Air permeability at 200 kPa | cc/cm²/sec | 180 | 130 | 165 | 106 | 130 | 130 | 150 |
|  | Fabric tenacity | warp, N/cm | 680 | 600 | 580 | 576 | 600 | 600 | 720 |
|  |  | weft, N/cm | 750 | 640 | 590 | 589 | 640 | 640 | 725 |
|  | Fabric elongation at break | warp, % | 38.8 | 40.0 | 43.7 | 39.9 | 40.0 | 40.0 | 39.0 |
|  |  | weft, % | 32.5 | 30.0 | 34.5 | 33.7 | 30.0 | 30.0 | 33.0 |
|  | Fabric specific load-elongation (elongation under load of 4.0 cN/dtex) | warp, % | 29.3 | 27.0 | 32.8 | 30.2 | 27.0 | 27.0 | 31.2 |
|  |  | weft, % | 21.4 | 19.0 | 23.0 | 22.4 | 19.0 | 19.0 | 20.0 |
|  | Total of specific load-elongation | % | 50.7 | 46.0 | 55.8 | 52.6 | 46.0 | 46.0 | 51.2 |
|  | Amount of finish oil component of fabric | % | 0.18 | 0.18 | 0.19 | 0.19 | 0.18 | 0.18 | 0.18 |
|  | Cyclic unimer content | NMR % | 0.91 | 0.91 | 0.91 | 0.91 | 0.02 | 0.91 | 0.91 |
|  | Cu Content | ppm | 50 | 50 | 50 | 50 | 50 | 50 | 50 |
|  | I Content | ppm | 1500 | 1500 | 1500 | 1500 | 1500 | 1500 | 1500 |
|  | Fe Content | ppm | 1.2 | 1.2 | 1.2 | 1.2 | 1.2 | 25 | 1.2 |
|  | Al Content | ppm | 2.0 | 2.0 | 2.0 | 2.0 | 2.0 | 0.01 | 2.0 |
|  | Inflator deployment pressure | kPa | 50 | 50 | 50 | 50 | 50 | 50 | 50 |
|  | Inflator deployment pressure after thermal aging (120° C., 1000 Hr) | kPa | 50 | 50 | 50 | 50 | 45 | 50 | 10 |
|  | Close proximity deployment |  | passed | passed | passed | passed | passed | passed | passed |
|  | Close proximity deployment after |  | passed | passed | passed | passed | passed | seam breaking | passed |

TABLE 2-continued thermal aging
(120° C., 1000 Hr)

|  |  |  | Comparative Example | | | | |
|---|---|---|---|---|---|---|---|
|  |  |  | 1 | 2 | 3 | 4 | 5 |
| <Original yarn> | Shrinkage in boiling water | % | 6.0 | 6.0 | 6.0 | 6.0 | 0.9 |
|  | Number of entanglements | entanglements/m | 7 | 35 | 7 | 7 | 15 |
|  | Number of twists | twists/m | 0 | 0 | 100 | 0 | 0 |
|  | Strength | cN/dtex | 8.2 | 8.2 | 8.2 | 6.5 | 7.0 |
|  | Elongation under load of 4.0 cN/dtex | % | 12.0 | 12.0 | 12.0 | 12.0 | 14.0 |
| <Processing conditions> | Scouring temperature | ° C. | 100 | 80 | 80 | 80 | 80 |
|  | Setting machine |  | pin tenter | pin tenter | pin tenter | pin tenter | heat roll |
|  | Setting temperature | ° C. | 210 | 160 | 160 | 160 | 150/180 |
|  | Overfeed | % (warp/weft) | 5/5 | 2/2 | 2/2 | 5/5 | 2/0 |
|  | Cooling method |  | slow cooling | quenching | quenching | slow cooling | quenching |
| <Raveled yarn> | Total yarn fineness | warp, dtex | 504 | 502 | 507 | 501 | 475 |
|  |  | weft, dtex | 490 | 486 | 486 | 489 | 473 |
|  | Number of filaments | warp, filaments | 72 | 72 | 72 | 72 | 96 |
|  |  | weft, filaments | 72 | 72 | 72 | 72 | 96 |
|  | Single filament fineness | warp, dtex | 7.0 | 7.0 | 7.0 | 7.0 | 4.9 |
|  |  | weft, dtex | 6.8 | 6.7 | 6.7 | 6.8 | 4.9 |
|  | Strength of raveled yarn | warp, cN/dtex | 6.9 | 7.8 | 7.8 | 5.8 | 6.7 |
|  |  | weft, cN/dtex | 6.8 | 7.3 | 7.3 | 6.2 | 6.5 |
|  | Elongation at break | warp, % | 19.2 | 18.9 | 18.9 | 26.0 | 20.0 |
|  |  | weft, % | 20.5 | 20.2 | 20.2 | 27.0 | 21.0 |
|  | Initial tensile modulus (stress at 2.5% elongation) | warp, cN/dtex | 0.31 | 0.31 | 0.31 | 0.31 | 1.06 |
|  |  | weft, cN/dtex | 0.66 | 0.66 | 0.61 | 0.70 | 1.27 |
|  | Specific load-elongation (elongation under load of 4.0 cN/dtex) | warp, % | 17.5 | 15.5 | 15.5 | 18.5 | 16.0 |
|  |  | weft, % | 15.2 | 13.2 | 13.2 | 18.0 | 15.8 |
|  | Shrinkage in boiling water | warp, % | 0.2 | 0.9 | 0.9 | 0.2 | 0.5 |
|  |  | weft, % | −2.5 | −1.8 | −1.8 | −2.5 | 0.7 |
|  | Number of entaglements | warp, entaglements/m | 0 | 25 | 0 | 0 | 0 |
|  |  | weft, entanglements/m | 0 | 25 | 0 | 0 | 0 |
|  | Number of twists | twists/m | 0 | 0 | 100 | 0 | 0 |
|  | twists | twists/m | 0 | 0 | 0 | 0 | 0 |
|  | Thermal stress (120° C.) | warp, cN/dtex | 0.01 | 0.01 | 0.01 | 0.01 | 0.01 |
|  |  | weft, cN/dtex | 0.02 | 0.02 | 0.02 | 0.02 | 0.01 |
|  | Thermal stress (230° C.) | warp, cN/dtex | 0.13 | 0.14 | 0.14 | 0.13 | 0.12 |
|  |  | weft, cN/dtex | 0.18 | 0.25 | 0.23 | 0.18 | 0.14 |
|  |  | total, cN/dtex | 0.31 | 0.39 | 0.37 | 0.31 | 0.26 |
| <Fabric characteristics> | Fabric density | warp, yarns/inch | 55.1 | 55.0 | 55.0 | 55.1 | 55.0 |
|  |  | weft, yarns/inch | 55.1 | 55.0 | 55.0 | 55.1 | 55.0 |
|  | Widening ratio R(w) | warp, % | 126 | 100 | 95 | 125 | 125 |
|  | Widening ratio R(f) | weft, % | 100 | 94 | 95 | 99 | 99 |
|  | Total widening | Ws % | 26 | −6 | −10 | 26 | 26 |
|  | Cover factor (CF) | based on dtex | 2457 | 2445 | 2451 | 2452 | 2395 |
|  | Basis weight | g/m² | 220 | 219 | 219 | 219 | 217 |
|  | Melting initiation temperature by DSC | ° C. | 249.5 | 251.0 | 251.0 | 250.0 | 241.6 |
|  | Heat of melting by DSC | J/g | 78 | 78 | 78 | 78 | 53 |
|  | Air permeability by FRAZIER | cc/cm²/sec | 0.1 | 0.2 | 0.2 | 0.1 | 0.1 |
|  | Air permeability at 200 kPa | cc/cm²/sec | 165 | 250 | 380 | 180 | 205 |
|  | Fabric tenacity | warp, N/cm | 720 | 606 | 606 | 500 | 615 |
|  |  | weft, N/cm | 725 | 645 | 645 | 530 | 632 |

TABLE 2-continued

|  |  |  |  |  |  |  |
|---|---|---|---|---|---|---|
| Fabric elongation at break | warp, % | 39.0 | 40.0 | 40.0 | 50.0 | 42.0 |
|  | weft, % | 33.0 | 29.3 | 29.3 | 45.0 | 38.0 |
| Fabric specific load-elongation (elongation under load of 4.0 cN/dtex) | warp, % | 31.0 | 30.6 | 30.6 | 37.1 | 35.0 |
|  | weft, % | 24.0 | 20.3 | 20.3 | 30.0 | 25.0 |
| Total of specific load-elongation | % | 55.0 | 51.0 | 51.0 | 67.1 | 60.0 |
| Amount of finish oil component of fabric | % | 0.05 | 0.05 | 0.05 | 0.05 | 0.05 |
| Cyclic unimer content | NMR % | 0.30 | 0.62 | 0.62 | 0.62 | — |
| Cu Content | ppm | 50 | 50 | 50 | 50 | — |
| I Content | ppm | 1500 | 1500 | 1500 | 1500 | — |
| Fe Content | ppm | 1.2 | 1.2 | 1.2 | 1.2 | 5.0 |
| Al Content | ppm | 2.0 | 2.0 | 2.0 | 2.0 | — |
| Inflator deployment pressure | kPa | 30 | 30 | 10 | 20 | 40 |
| Inflator deployment pressure after thermal aging (120° C., 1000 Hr) | kPa | 30 | 40 | 20 | 20 | 40 |
| Close proximity deployment |  | passed | passed | passed | seam rupture | rupture by hot particle |
| Close proximity deployment after thermal aging (120° C., 1000 Hr) |  | passed | passed | passed | – | +– |

Examples 8 to 10

Airbag fabrics were obtained in the same manner as in Example 1, except for changing the amount added of the cyclic unimer during spinning. The airbags sewn were evaluated for the ratio of deployment time between before and after heat treatment, the heat resistance of dimensional stability, the ratio of deployment time under cold conditions and the fabric burning test. The results are shown in Table 3.

The airbags of Examples 8 and 9 had mechanical characteristics necessary for an airbag and excellent tear tenacity retention after heat treatment and were excellent in the air permeability retention ratio after heat treatment and the characteristics related to the airbag deployment speed, such as low frictional properties and flexibility. Particularly, in the deployment under cold conditions, the deployment speed was reduced due to reduction in the generated gas pressure but well maintained. In Example 10, the frictional coefficient after heat treatment was high, the flexibility was poor and the airbag deployment after heat treatment and under cold conditions was slightly delayed, but a rupture of the bag was not caused.

TABLE 3

|  |  | Example 8 | Example 9 | Example 10 | Example 11 | Example 12 |
|---|---|---|---|---|---|---|
| Ratio of cyclic unimer component of fabric | % | 0.91 | 2.50 | 0.02 | 0.91 | 0.91 |
| Oil content of fabric | % | 0.18 | 0.18 | 0.18 | 0.19 | 1.2 |
| Cu Element | ppm | 50 | 50 | 50 | 50 | 50 |
| Fe Element | ppm | 1.20 | 1.20 | 1.20 | 1.20 | 1.20 |
| Al Element | ppm | 2.0 | 2.0 | 2.0 | 2.0 | 2.0 |
| Ratio of deployment time between before and after heat treatment |  | 103 | 100 | 110 | 103 | 100 |
| Ratio of deployment time under cold conditions |  | 120 | 117 | 138 | 120 | 115 |
| Fabric burning test |  | self-extinguishing passed | self-extinguishing passed | self-extinguishing passed | self-extinguishing passed | 75 mm/min passed |
| Heat-resistant dimensional stability |  |  |  |  |  |  |

Example 11

Polymerization and spinning were performed in the same manner as in Example 4 to obtain a filament yarn composed of a drawn polyamide 6•6 fiber yarn. Using this multi filament yarn, a plain fabric was obtained in a waterjet room in the same manner as in Example 4. The obtained fabric was dried and then heatset at 180° C. for 1 minute to obtain an airbag fabric. The results including the evaluations of the airbag are shown in Table 3.

Example 12

The same procedure as in Example 11 was performed except that a finish oil component having the same composition as the spinning finish oil was imparted by immersion after the weaving and then the fabric was dried and heatset. Incidentally, the content of the finish oil component after heatsetting was 1.2 wt %. The results are shown together in Table 2. The burning test gave a rating of slight fire spread but was passed, and the deployability of bag was very good.

INDUSTRIAL APPLICABILITY

The fabric of the present invention can be suitably used as a body-restraining airbag for absorbing impact on the human body in a vehicle collision accident or the like. In particular, the fabric of the present invention is suitable as a lightweight compact airbag module.

The invention claimed is:

1. An airbag fabric comprising a polyamide yarn, wherein the cyclic unimer content in the fabric is from 0.1 to 3.0% based on all amide bond units, the air permeability of the fabric under a pressure of 200 kPa is from 10 to 200 cc/cm²/sec and in the thermal stress of the constituent yarn as measured under the conditions of an initial load of 0.02 cN/dtex, a yarn length of 25 cm and a temperature rise rate of 80° C./min, the summed thermal stress of the total of the warp yarn and the weft yarn at 230° C. is from 0.33 to 1.20 cN/dtex.

2. The airbag fabric according to claim 1, wherein the polyamide fiber is obtained by melt-spinning with the addition of an oligomer containing a cyclic unimer.

3. The airbag fabric according to claim 1, wherein the content of the spin finish component in the fabric is from 0.01 to 2.0 wt %.

4. The airbag fabric according to claim 1, wherein the total widening Ws as the sum of the widening ratio R(f) of the weft yarn and the widening ratio R(w) of the warp yarn on the fabric surface is from 0 to 40%.

5. The airbag fabric according to claim 1, wherein the widening ratio R(f) of the weft yarn on the fabric surface is from 90 to 120% and the widening ratio R(w) of the warp yarn on the fabric surface is from 105 to 135%.

6. The airbag fabric according to claim 1, wherein in the stress-strain curve of the fabric, the total value of the elongation under a load corresponding to 4.0 cN/dtex in terms of a stress per one yarn constituting the fabric in the warp yarn direction of the fabric and that in the weft yarn direction is from 40.0 to 58.0%.

7. The airbag fabric according to claim 1, wherein in DSC measurement of measuring the fabric at a temperature rise rate of 20° C./min, the melting initiation temperature is from 245 to 280° C. and the heat of melting is from 60 to 100 J/g.

8. The airbag fabric according to claim 1, wherein the thermal stress determined by measuring the constituent yarn of the fabric under the conditions of an initial load of 0.02 cN/dtex, a yarn length of 25 cm and a temperature rise rate of 80° C./min is from 0.005 to 0.10 cN/dtex at 120° C. in both the warp yarn and the weft yarn.

9. The airbag fabric according to claim 1, wherein the constituent yarn is a polyamide 6.6 yarn having a relative viscosity of 2.7 to 4.7, a single filament fineness of 0.8 to 8.0 dtex, a total yarn fineness of 100 to 800 dtex, a tensile tenacity of 5.0 to 11.0 cN/dtex, an elongation at break of 15 to 35% and a shrinkage in boiling water of −4.5 to 5.0%.

10. The airbag fabric according to claim 1, which is not coated with a resin or an elastomer.

11. An airbag using the airbag fabric according to claim 1.

12. An airbag module using the airbag according to claim 11.

* * * * *